United States Patent
Watanabe et al.

(10) Patent No.: US 9,461,330 B2
(45) Date of Patent: Oct. 4, 2016

(54) STACKING DEVICE AND STACKING METHOD

(75) Inventors: Masashi Watanabe, Atsugi (JP);
Hiroshi Yuhara, Yokohama (JP);
Manabu Yamashita, Kyoto (JP)

(73) Assignee: NISSAN MOTOR CO., LTD.,
Yokohama-Shi (JP)

( * ) Notice: Subject to any disclaimer, the term of this patent is extended or adjusted under 35 U.S.C. 154(b) by 278 days.

(21) Appl. No.: 14/009,660

(22) PCT Filed: Apr. 6, 2012

(86) PCT No.: PCT/JP2012/059496
§ 371 (c)(1),
(2), (4) Date: Oct. 3, 2013

(87) PCT Pub. No.: WO2012/137917
PCT Pub. Date: Oct. 11, 2012

(65) Prior Publication Data
US 2014/0026398 A1    Jan. 30, 2014

(30) Foreign Application Priority Data

Apr. 7, 2011 (JP) ................................. 2011-085788
Mar. 23, 2012 (JP) ................................. 2012-067848

(51) Int. Cl.
| H01M 10/04 | (2006.01) |
| B32B 38/18 | (2006.01) |
| H01M 10/0585 | (2010.01) |
| H01M 10/052 | (2010.01) |
| B32B 39/00 | (2006.01) |

(52) U.S. Cl.
CPC .......... *H01M 10/0404* (2013.01); *B32B 38/18* (2013.01); *H01M 10/0468* (2013.01); *H01M 10/052* (2013.01); *H01M 10/0585* (2013.01); *B32B 39/00* (2013.01); *B32B 2457/10* (2013.01); *Y02E 60/122* (2013.01); *Y02T 10/7011* (2013.01); *Y10T 29/49108* (2015.01); *Y10T 29/53135* (2015.01)

(58) Field of Classification Search
CPC ................... H01M 10/0404; H01M 10/0585; H01M 10/0468; H01M 10/052
See application file for complete search history.

(56) References Cited

FOREIGN PATENT DOCUMENTS

| JP | 4-101366 A | 4/1992 |
| JP | 2003-272595 A | 9/2003 |
| JP | 2005-050583 A | 2/2005 |
| JP | 2005-285583 A | 10/2005 |
| JP | 2008-282756 A | 11/2008 |
| JP | 2009-206046 A | 9/2009 |
| JP | 2010-89898 | 4/2010 |
| JP | 2011-129255 A | 6/2011 |

OTHER PUBLICATIONS

European Search Report, Aug. 29, 2014, 8 pages.

*Primary Examiner* — Jane Rhee
(74) *Attorney, Agent, or Firm* — Foley & Lardner LLP

(57) ABSTRACT

A first holding unit (114) reciprocates between a first table (121) and a stacking table (141) and a second holding unit (115) reciprocates between the stacking table (141) and a second table (141). When the first holding unit (114) holds a separator-electrode assembly (20) whose horizontal position has been adjusted on the first table (121), the second holding unit (115) releases a second electrode (30) over the stacking table (141). When the first holding unit (114) releases the separator-electrode assembly (20) over the stacking table (141), the second holding unit (115) holds the second electrode (30) whose horizontal position has been adjusted on the second table (131). The present invention provides a stacking device and a stacking method which are capable of stacking the separator-electrode assembly including a first electrode sandwiched by separators and the second electrode having a different polarity from the first electrode efficiently with high accuracy.

13 Claims, 16 Drawing Sheets

FIG. 3
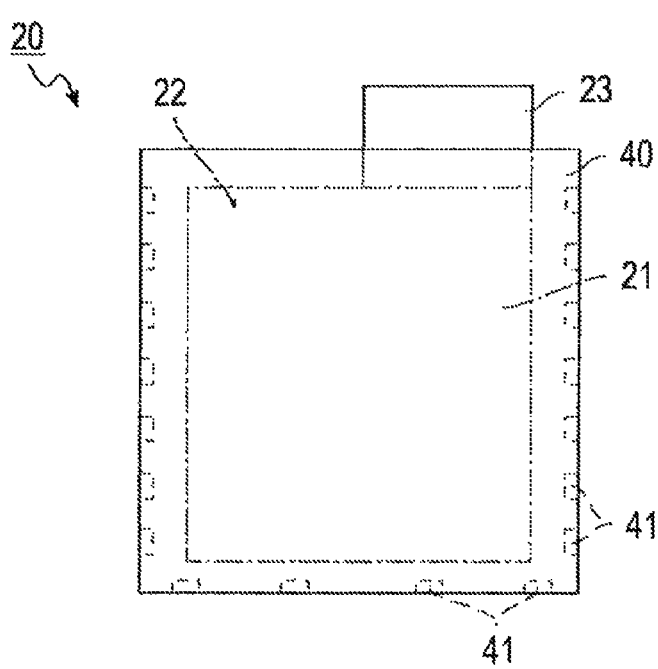
(A)
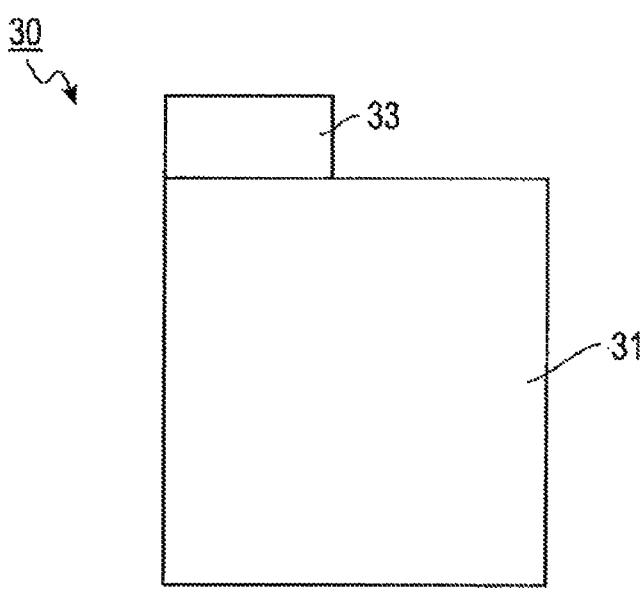
(B)

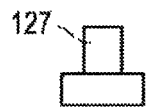
FIG. 7
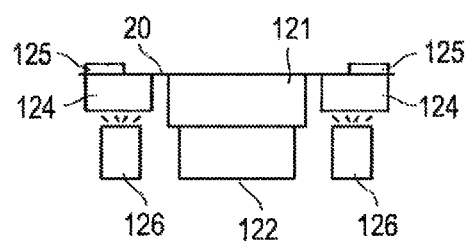
FIG. 8
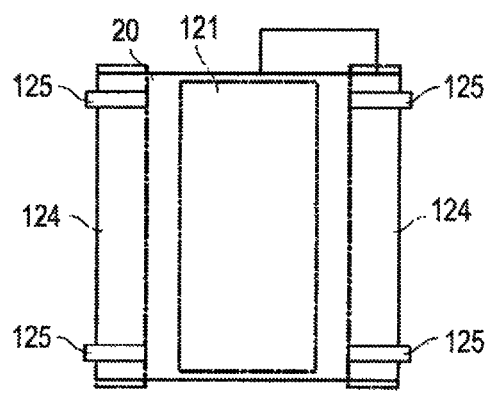

FIG. 9
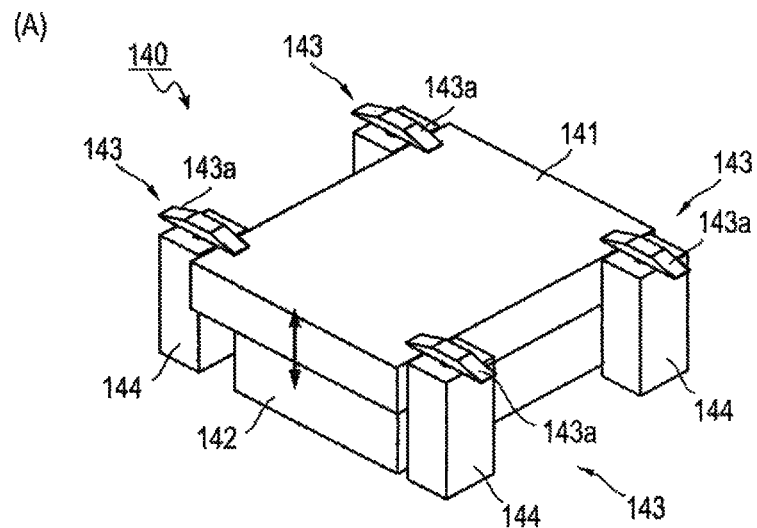
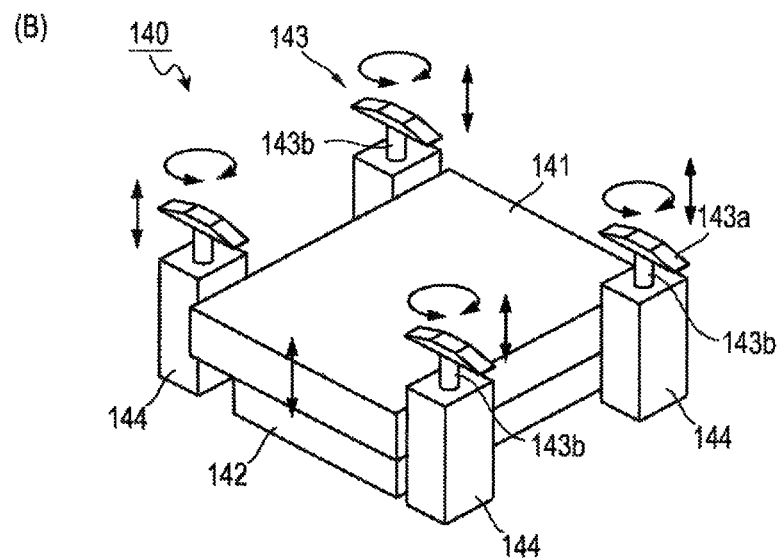

FIG. 24
(A)
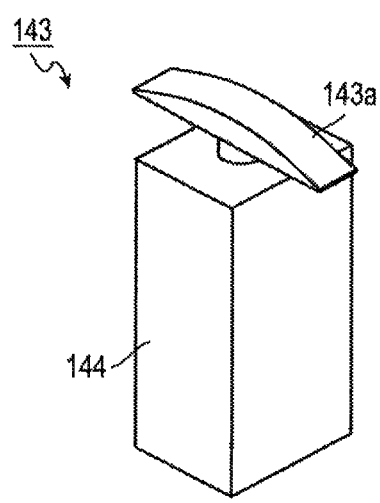
(B)
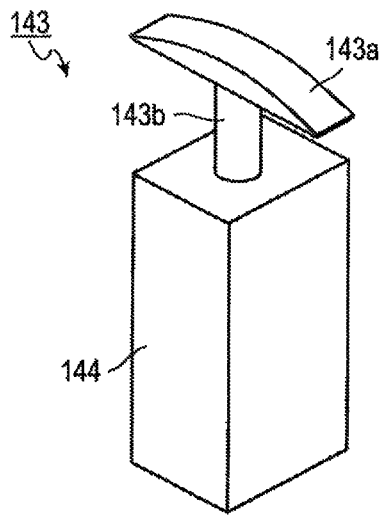

STACKING DEVICE AND STACKING METHOD

TECHNICAL FIELD

The present invention relates to a stacking device and a stacking method.

BACKGROUND ART

In recent years, electric vehicles (EVs) and hybrid electric vehicles (HEVs) are being developed in the backdrop of growing environmental protection movement. As power supplies used to drive the motors of these EVs and HEVs, lithium ion secondary batteries capable of being repeatedly charged and discharged are attracting attentions.

A lithium ion secondary battery includes a stack of plural unit cells, each unit cell including sheet-shaped positive and negative electrodes with a separator interposed therebetween. The separator is impregnated with an electrolyte. The electrodes (positive/negative electrodes) and separators are repeatedly stacked in the manufacturing process.

As a technique concerning the same, a manufacturing apparatus shown in Patent Literature 1 below is proposed in terms of reduction in manufacturing time of lithium ion secondary batteries. The manufacturing apparatus disclosed in Patent Literature 1 includes: a first conveyor configured to convey cathode plates wrapped by separators (hereinafter, referred to as cathode packages); a second conveyor for conveying anode plates; a third conveyor configured to convey a stacked body of the cathode packages and anode plates; and a swinging device swinging two suction devices. One of the two suction devices swings between the first and third conveyors while sucking and holding the cathode packages on the first conveyor and releasing the same above the third conveyor. The other suction device swings between the second and third conveyors while sucking and holding the anode plates on the second conveyor and releasing the same above the third conveyor. With the above configuration, the two suction devices alternately release the cathode packages and anode plates above the third conveyor, so that the cathode packages and anode plates are efficiently stacked on the third conveyor.

CITATION LIST

Patent Literature

Patent Literature 1: Japanese Patent Laid-open Publication No. H04-101366

SUMMARY OF INVENTION

Technical Problem

In the aforementioned manufacturing apparatus, the suction devices directly suck and hold the cathode packages and anode plates which are conveyed by the first and second conveyors one by one. Accordingly, the positional accuracy is not high when the suction devices suck and hold the cathode packages and anode plates. If the cathode packages and anode plates are sucked and held with a low positional accuracy, the cathode packages and anode plates cannot be stacked with high accuracy, thus leading to degradation in quality of secondary batteries. Accordingly, the aforementioned manufacturing apparatus includes a positioning holder on the third conveyor, and the cathode packages and anode plates are inserted into the positioning holder to be stacked. When the cathode packages and anode plates are inserted into the holder by the suction devices, the cathode packages and anode plates are positioned with the side surfaces thereof brought into contact with the inner wall of the holder, thus increasing the stacking accuracy of the cathode packages and anode plates.

However, the separators wrapping the cathode plates are soft and flexible. When an cathode package is inserted into the holder and the side surface thereof comes into contact with the inner wall of the holder, the edge of the separator could fold, thus preventing the cathode package from being positioned correctly. If the cathode packages are incorrectly positioned, it is impossible to obtain adequate stacking accuracy.

Solution to Problem

The present invention has been made to solve the aforementioned problem. Accordingly, an object of the present invention is to provide a stacking device and a stacking method which are capable of stacking a separator-electrode assembly including a first electrode sandwiched by separators and a second electrode having a different polarity from the first electrode efficiently with high accuracy.

A first aspect of the present invention is a stacking device for alternately stacking a separator-electrode assembly and a second electrode, the separator-electrode assembly including a first electrode sandwiched by separators, the second electrode having a different polarity from the first electrode. The stacking device includes a first table, a second table, a stacking table, a first adjustment unit, a second adjustment unit, a first holding unit, and a second holding unit. On the first table, the separator-electrode assembly is placed. On the second table, the second electrode is placed. On the stacking table, the separator-electrode assembly and the second electrode are alternately stacked. The first adjustment unit is configured to adjust a horizontal position of the first table to adjust the position of the separator-electrode assembly placed on the first table. The second adjustment unit is configured to adjust a horizontal position of the second table to adjust the position of the second electrode placed on the second table. The first holding unit is configured to hold and release the separator-electrode assembly. The second holding unit is configured to hold and release the second electrode. The first holding unit reciprocates between the first table and the stacking table and the second holding unit reciprocates between the stacking table and the second table. When the first holding unit holds the separator-electrode assembly whose position has been adjusted on the first table, the second holding unit releases the second electrode over the stacking table. When the first holding unit releases the separator-electrode assembly over the stacking table, the second holding unit holds the second electrode whose position has been adjusted on the second table.

A second aspect of the present invention is a stacking method of alternately stacking a separator-electrode assembly and a second electrode, the separator-electrode assembly including a first electrode sandwiched by separators, the second electrode having a different polarity from the first electrode. The stacking method causes a first holding unit to reciprocate between a first table on which the separator-electrode assembly is placed and a stacking table on which the separator-electrode assembly and the second electrode are alternately stacked. On the other hand, the stacking method causes a second holding unit to reciprocate between the stacking table and the second table on which the second electrode is placed. The stacking method causes the second holding unit to release the second electrode over the stacking table when causing the first holding unit to hold the separator-electrode assembly whose position has been adjusted on the first table by adjustment of the horizontal position of the first table. The stacking method causes the second holding unit to hold the second electrode whose position has been adjusted on the second table by adjustment of a horizontal position of the second table when causing the first holding unit to release the separator-electrode assembly over the stacking table.

BRIEF DESCRIPTION OF DRAWINGS

FIG. 3 shows plan views of a packaged positive electrode and a negative electrode.

FIG. 7 is a front view of a positive electrode feed section in the direction of an arrow of FIG. 6.

FIG. 8 is a plan view of the positive electrode feed section.

FIG. 9 is a perspective view of a stacking section.

FIG. 24 shows perspective views illustrating a modification of a clamper.

DESCRIPTION OF EMBODIMENTS

Figure 1:
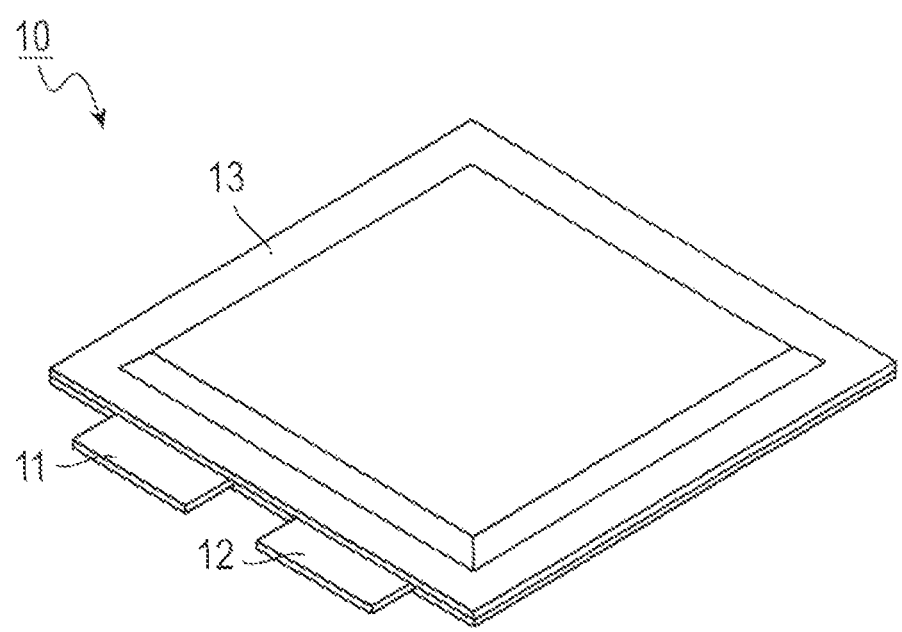
FIG. 1 is a perspective view illustrating an appearance of a lithium ion secondary battery.

Hereinafter, a description is given of an embodiment of the present invention with reference to the accompanying drawings. Some of the dimensional proportions in the drawings are exaggerated for convenience of explanation and are different from actual ones.

Figure 2:
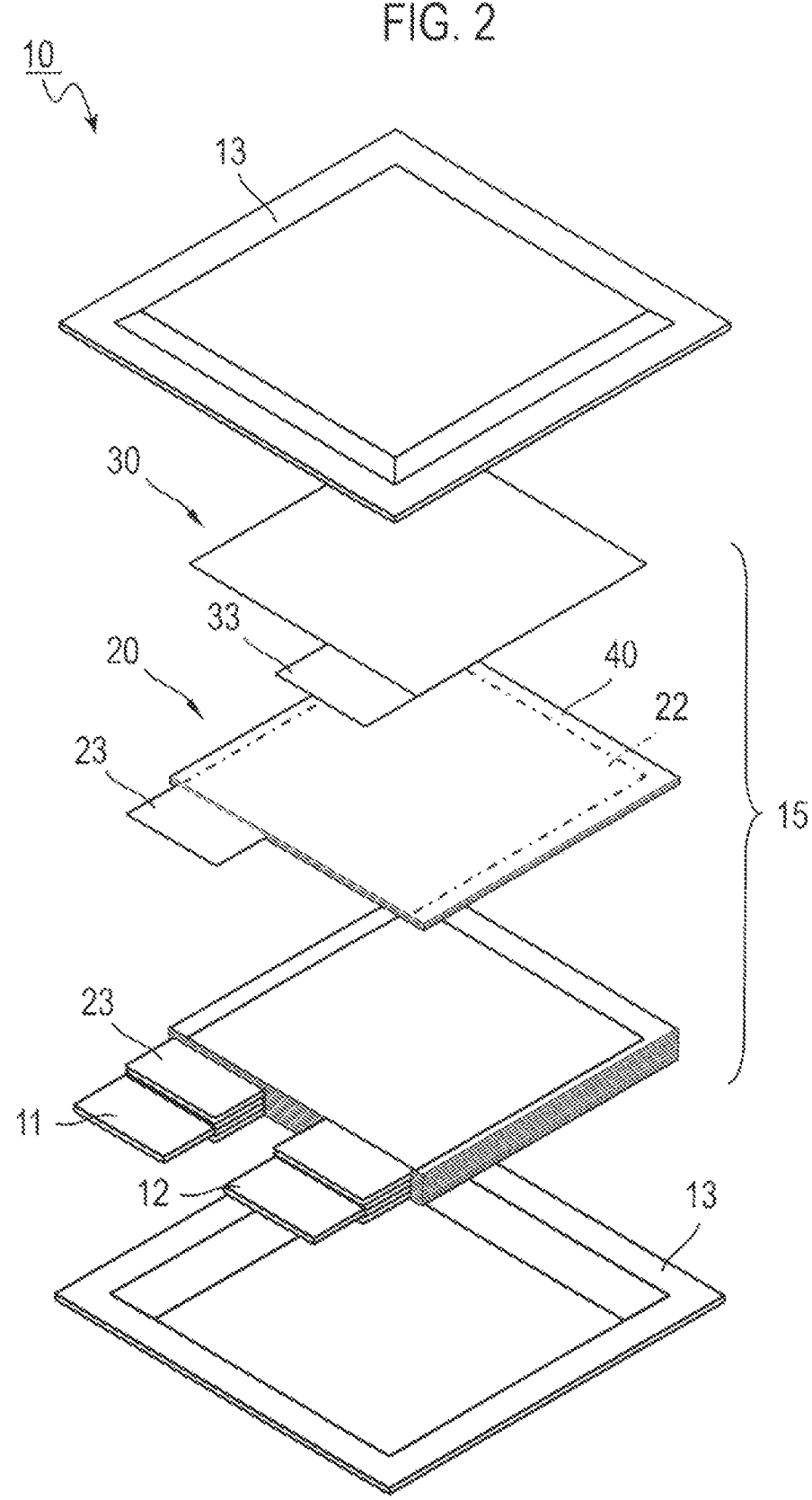
FIG. 2 is an exploded perspective view of the lithium ion secondary battery.

First, a lithium ion secondary battery (laminate battery) formed by a sheet stacking device is described with reference to FIGS. 1 and 2. FIG. 1 is a perspective view illustrating an appearance of the lithium ion secondary battery, and FIG. 2 is an exploded perspective view of the lithium ion secondary battery.

As illustrated in FIG. 1, a lithium ion secondary battery 10 has a flat rectangular shape and includes a positive-electrode lead 11 and a negative-electrode lead 12 extended out from a same end of an exterior member 13. The exterior member 13 accommodates a power generation element (battery element) 15 inside, in which charge and discharge reactions proceed. As illustrated in FIG. 2, the power generation element 15 includes packaged positive electrodes 20 and negative electrodes 30 alternately stacked on one another.

Each of the packaged positive electrodes 20 includes a positive electrode 22 sandwiched by separators 40 as illustrated in FIG. 3(A). The positive electrode 22 includes a sheet-shaped positive current collector with positive-electrode active material layers 21 formed on both sides of the collector. The two separators 40 are joined to each other with a joint portion 41 at the edge and formed in a bag shape. In the positive electrode 22, the positive-electrode active material layers 21 are formed in part other than a tab portion 23 of the positive current collector. The tab portion 23 is extended out of the bag-shaped separators 40.

Each of the negative electrodes 30 includes a sheet-shaped negative current collector with negative-electrode active material layers 31 formed on both sides as illustrated in FIG. 3(B). In the negative electrode 30, the negative-electrode active material layers 31 are formed in part other than a tab portion 33 of the negative current collector.

Figure 4:
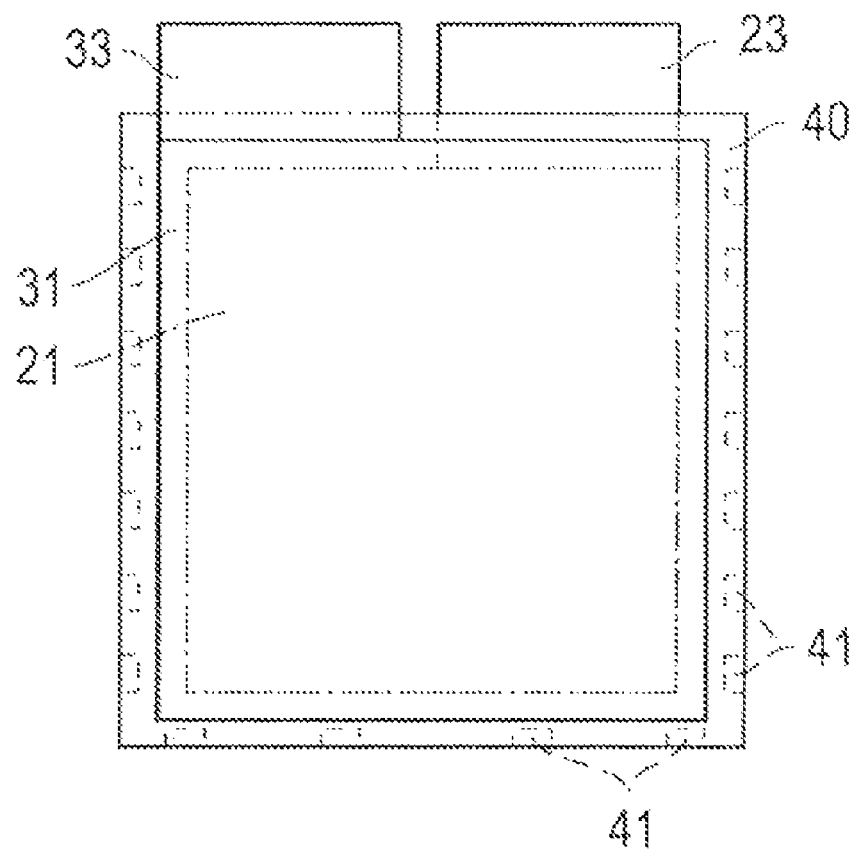
FIG. 4 is a plan view illustrating the negative electrode laid on the packaged positive electrode.

The packaged positive electrode 20 is overlaid on the corresponding negative electrode 30 as illustrated in FIG. 4. As illustrated in FIG. 4, the negative active material layers 31 are slightly larger than the positive-electrode active material layers 21 of the positive electrode 22 in a plan view. The method of manufacturing a lithium ion secondary battery by alternately stacking the packaged positive electrodes 20 and negative electrodes 30 is a general method, and the detailed description thereof is omitted.

Next, a description is given of a sheet stacking device to assemble the aforementioned power generation element 15.

Figure 5:
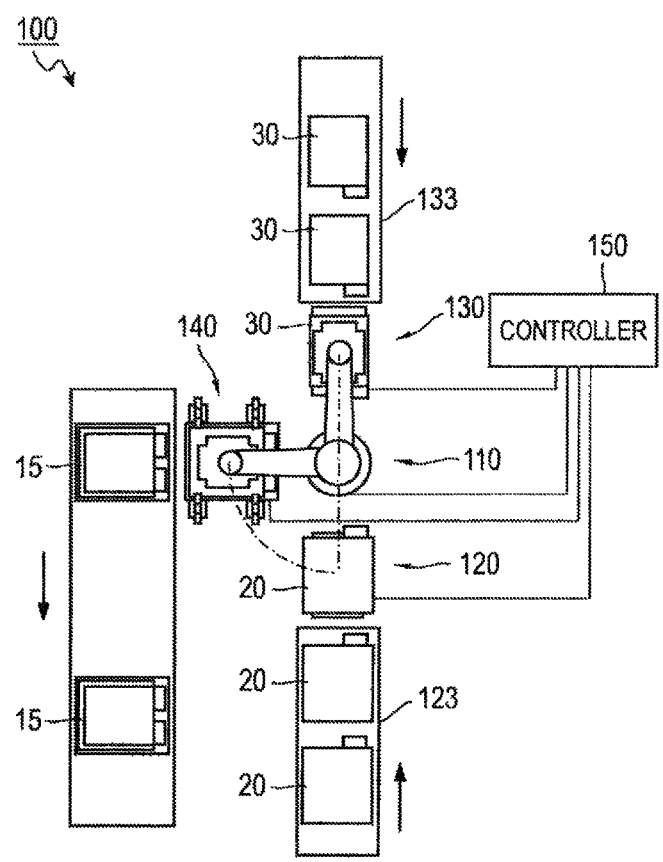
FIG. 5 is a schematic plan view illustrating a sheet stacking device.
Figure 6:
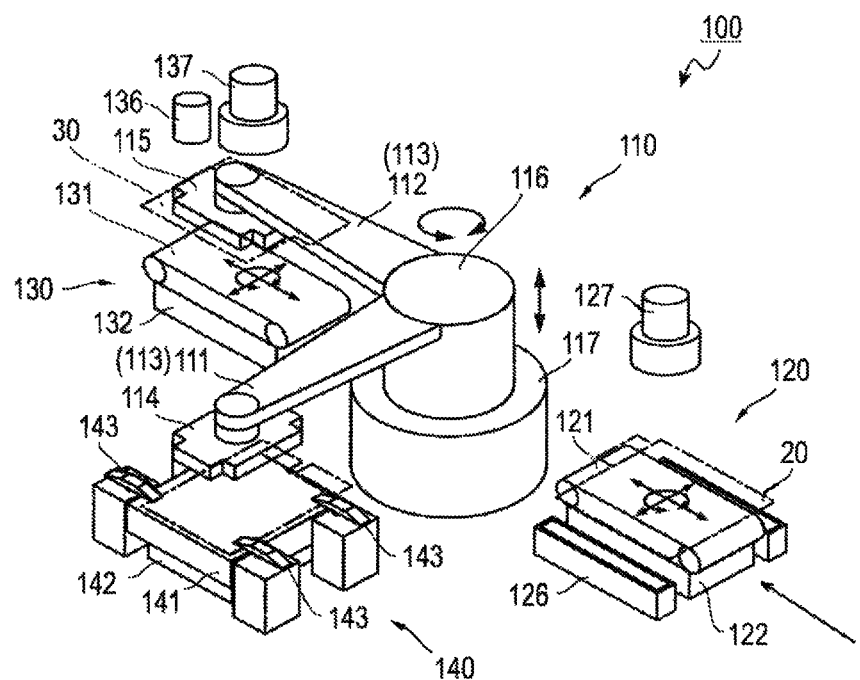
FIG. 6 is a perspective view illustrating the sheet stacking device.

FIG. 5 is a schematic plan view illustrating the sheet stacking device. FIG. 6 is a perspective view illustrating the sheet stacking device. FIG. 7 is a front view of a positive electrode feed section in a direction of an arrow of FIG. 6. FIG. 8 is a plan view of the positive electrode feed section.

A sheet stacking device 100 includes a stacking robot 110, a positive electrode feed section 120, a negative electrode feed section 130, a stacking section 140, and a controller 150 as illustrated in FIGS. 5 and 6. The positive and negative electrode feed sections 120 and 130 are arranged at positions opposite to each other across the stacking robot 110. The stacking section 140 is arranged at 90 degrees from the positive and negative electrode feed sections 120 and 130. The stacking robot 110, positive and negative electrode feed sections 120 and 130, and stacking section 140 are controlled by the controller 150.

The stacking robot 110 alternately stacks the packaged positive electrodes 20 and negative electrodes 30 to form the power generation element (stack) 15. The stacking robot 110 includes an L-shaped arm 113 and first and second suction hands 114 and 115. The L-shaped arm 113 includes first and second arm portions 111 and 112. The first and second suction hands 114 and 115 are provided at distal ends of the first and second arm portions 111 and 112, respectively. The first and second arm portions 111 and 112 are extended in directions 90 degrees from each other with respect to a driving shaft 116. The L-shaped arm 113 swings 90 degrees in the horizontal direction when the driving shaft 116 is driven by an arm driving unit 117. The L-shaped arm 113 rises and lowers when the driving shaft 116 is driven. The first suction hand 114 sucks and holds each packaged positive electrode 20 and releases the same. The second suction hand 115 sucks and holds each negative electrode 30 and releases the same.

When the L-shaped arm 113 swings 90 degrees, the first suction hand 114 reciprocates between the positive electrode feed section 120 and stacking section 140, and the second suction hand 115 reciprocates between the stacking section 140 and negative electrode feed section 130. In other words, the swinging L-shaped arm 113 switches between a first state in which the first and second suction hands 114 and 115 are located over the positive electrode feed section 120 and stacking section 140, respectively, and a second state in which the first and second suction hands 114 and 115 are located over the stacking section 140 and negative electrode feed section 130, respectively. When the L-shaped arm 113 rises and lowers, the first suction hand 114 moves apart from and close to the positive electrode feed section 120 or stacking section 140, and the second suction hand 115 moves apart from or close to the negative electrode feed section 130 or stacking section 140.

The positive electrode feed section 120 feeds the packaged positive electrodes 20. The positive electrode feed section 120 includes: a positive electrode feed table 121 on which each packaged positive electrode 20 is placed; and a table driving unit 122 configured to move and rotate the positive electrode feed table 121 in a horizontal plane. The positive electrode feed table 121 receives, one by one, the packaged positive electrodes 20 which is created by the previous process and is delivered by a suction conveyor 123. Each received packaged positive electrode 20 is placed on the positive electrode feed table 121. The positive electrode feed table 121 is also a suction conveyor. The positive electrode feed table 121 sucks each packaged positive electrode 20 which is released from the negative pressure of the suction conveyor 123, conveys the same substantially to the center, and fixes the same with the negative pressure. The positive electrode feed table 121 releases the suction when the packaged positive electrode 20 is sucked by the first suction hand 114. The table driving unit 122 moves or rotates the positive electrode feed table 121 in a horizontal plane to adjust the position of the packaged positive electrode 20 placed on the positive electrode feed table 121. The table driving unit 122 includes three motors to move and rotate the positive electrode feed table 121 in a horizontal plane.

The positive electrode feed table 121 is narrower than the suction conveyor 123 so that edges of the packaged positive electrode 20 protrude from the positive electrode feed table 121. As illustrated in FIGS. 7 and 8, transparent supports 124 are provided on both sides of the positive electrode feed table 121 (not illustrated in FIGS. 5 and 6). The supports 124 support the edges of the packaged positive electrode 20 protruding from the positive electrode feed table 121. Moreover, clampers 125 are provided at positions corresponding to the respective supports 124. The clampers 125 sandwich and fix the edges of the packaged positive electrode 20 together with the supports 124. The supports 124 and clampers 125 are both movable. The supports 124 and clampers 125 move close to the packaged positive electrode 20 to support and fix the edges of the packaged positive electrode 20 when the packaged positive electrode 20 is placed on the positive electrode feed table 121.

Moreover, light sources 126 are provided below the positive electrode feed table 121, and a camera 127 is provided above the positive electrode feed table 121. The light sources 126 are installed under the respective transparent supports 124 and project light onto the edges of the packaged positive electrode 20. The light sources 126 project light having such a wavelength to be transmitted through the separators 40 with a predetermined transmittance or higher and is not transmitted (is reflected or absorbed by) through the positive electrode 22. The camera 127 captures an image of the packaged positive electrode 20 and recognizes the position of the positive electrode 22 (packaged positive electrode 20) placed on the positive electrode feed table 121. The camera 127 receives the light which is projected from the light sources 126 and is transmitted through the separators 40 while being partially cut off by the positive electrode 22 and recognizes the position of the positive electrode 22. In other words, the camera 127 recognizes the position of the positive electrode 22 based on the shadow of the positive electrode 22. Based on the information of the position of the positive electrode 22 recognized by the camera 127, the horizontal position of the positive electrode 22 (packaged positive electrode 20) is adjusted. By the adjustment of the horizontal position of the positive electrode 22, the first suction hand 114 can pick up the packaged positive electrodes 20 every time with the positive electrode 22 accurately positioned.

Back in FIGS. 5 and 6, the negative electrode fed section 130 feeds the negative electrodes 30. The negative electrode feed section 130 includes: a negative electrode feed table 131 on which each negative electrode 30 is placed; and a table driving unit 132 configured to move and rotate the negative electrode feed table 131 in a horizontal plane. The negative electrode feed table 131 receives one by one, the negative electrodes 30 which are created by the previous process and are delivered by a suction conveyor 133. Each received negative electrode 30 is placed on the negative electrode feed table 131. The negative electrode feed table 131 is also a suction conveyor. The negative electrode feed table 131 sucks each negative electrode 30 which is released from the negative pressure of the suction conveyor 133, conveys the same substantially to the center, and fixes the same with the negative pressure. The negative electrode feed table 131 releases the suction when the negative electrode 30 is sucked by the second suction hand 115. The table driving unit 132 moves or rotates the negative electrode feed table 131 in a horizontal plane to adjust the position of the negative electrode 30 placed on the negative electrode feed table 131. The table driving unit 132 includes three motors to move and rotate the negative electrode feed table 131 in a horizontal plane.

Moreover, a light source 136 and a camera 137 are provided above the negative electrode feed table 131. The light source 136 projects onto the negative electrode 30, light having such a wavelength to be not transmitted through (is reflected or absorbed by) the negative electrode 30. The camera 137 captures an image of the negative electrode 30 and recognizes the position of the negative electrode 30 placed on the negative electrode feed table 131. The camera 137 receives the light which is projected from the light source 136 and is reflected on the negative electrode 30 to recognize the position of the negative electrode 30. Based on the positional information of the negative electrode 30 recognized by the camera 137, the horizontal position of the negative electrode 30 is adjusted. By the adjustment of the horizontal position of the negative electrode 30, the second suction hand 115 can pick up the negative electrode 30 accurately positioned every time.

The stacking section 140 is a place where the packaged positive electrodes 20 and negative electrodes 30 delivered by the stacking robot 110 are alternately stacked. The stacking section 140 holds the stack of the packaged positive electrodes 20 and negative electrodes 30 until a predetermined number of packaged positive electrodes 20 and a predetermined number of negative electrodes 30 are stacked. When the predetermined numbers of packaged positive electrodes 20 and negative electrodes 30 are stacked and the power generation element 15 is completed, the stacking section 140 feeds the power generation element 15 to a subsequent process.

FIG. 9 is a perspective view of the stacking section. The stacking section 140 includes: a stacking table 141 on which the packaged positive electrodes 20 and negative electrodes 30 are alternately stacked; a height adjustment unit 142 which raises and lowers the stacking table 141; clampers 143 which press the stack of the packaged positive electrodes 20 and negative electrodes 30; and clamper driving units 144 which drive the respective clampers 143.

On the stacking table 141, a pallet (not shown) is placed. The packaged positive electrodes 20 and negative electrodes 30 are alternately stacked on the pallet. The height adjustment unit 142 includes a ball screw and a motor, for example and lowers the stacking table 141 according to the progress of stacking the packaged positive electrodes 20 and negative electrode 30. The height adjustment unit 142 lowers the stacking table 141 so that the top surface of the stack of the packaged positive electrodes 20 and negative electrodes 30 is maintained at a substantially constant height.

Each of the clampers 143 includes: a clamp head 143a which presses down the stack of the packaged positive electrodes 20 and negative electrodes 30; and a support shaft 143b supporting the clamp head 143a. The clamp head 143a has a trapezoidal cross section. The clamp head 143a is biased downward through the support shaft 143b to press the top surface of the stack with the bottom surface thereof.

The clamper driving unit 144 rotates the clamp head 143a and raises the same to a certain height through the support shaft 143b. The clamper driving unit 144 lowers the clamp head 143a rotated 180 degrees. The clamper driving unit 144 includes a cam mechanism (not shown) and an actuator (not shown). The cam mechanism includes a cam groove which is engaged with a protruding pin (not shown) provided on the side surface of the support shaft 143b to rotate the clamp head 143a and raise the same by a certain amount. The actuator raises and lowers the support shaft 143b. The actuator is an air cylinder, for example. Each clamper driving unit 144 includes a spring (not shown) configured to bias the clamp head 143a downward.

In the thus-configured sheet stacking device 100, the packaged positive electrodes 20 and negative electrodes 30 which are respectively placed on the positive electrode feed table 121 and negative electrode feed table 131 are picked up by the stacking robot 110 and are alternately conveyed onto the stacking table 141. The packaged positive electrodes 20 and negative electrodes 30 are alternately conveyed onto the stacking table 141 to form a stack of the packaged positive electrodes 20 and negative electrodes 30.

In this embodiment, the first and second arm portions 111 and 112 are extended in the directions 90 degrees from each other, and the L-shaped arm 113 is configured to swing 90 degrees. However, the first and second arm portions 111 and 112 can be extended in directions a predetermined angle apart other than 90 degrees. In this case, the L-shaped arm 113 is also configured to swing by the predetermined angle. The arrangement of the positive and negative electrode feed sections 120 and 130 and the stacking section 140 is adjusted corresponding to the angle of swing.

Next, a description is given of an operation of the sheet stacking device 100 of this embodiment with reference to FIGS. 10 to 23.

First, the operation of the stacking robot 110 is described. FIGS. 10 to 15 are views for explaining the operation to stack the packaged positive electrodes 20 and negative electrodes 30 with the stacking robot 110. The following description is given of the operation starting from the phase at which the stacking robot 110 stacks a packaged positive electrode 20.

Figure 10:
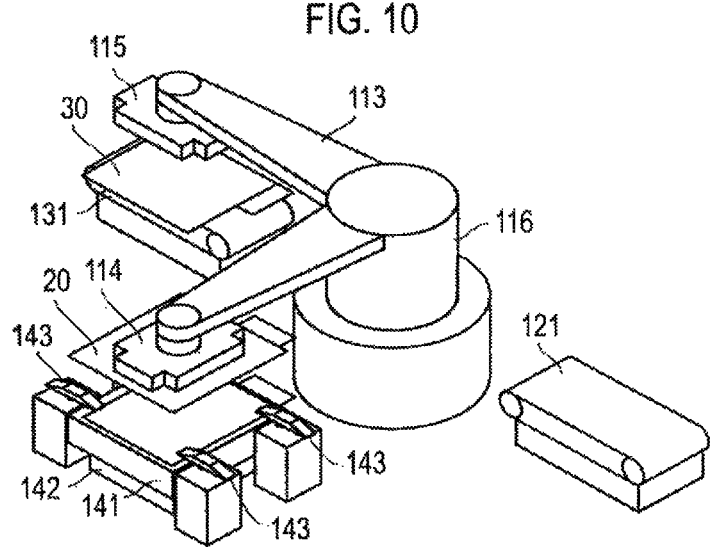
FIG. 10 is a view for explaining an operation of a stacking robot.

As illustrated in FIG. 10, at the phase of stacking the packaged positive electrode 20 with the stacking robot 110, the first suction hand 114 of the stacking robot 110 which is sucking and holding the packaged positive electrode 20 is located over the stacking table 141. On the other hand, the second suction hand 115 of the stacking robot 110 is located over the negative electrode feed table 131. On the stacking table 141, a stack of packaged positive electrodes 20 and negative electrodes 30 is placed. On the negative electrode feed table 131, a negative electrode 30 is placed. The horizontal position of the negative electrode 30 on the negative electrode feed table 131 is adjusted based on the positional information obtained by the camera 137 so that the second suction hand 115 can suck and hold the negative electrode 30 at a precise position. To be specific, the horizontal position of the negative electrode 30 is adjusted so that the center of the negative electrode 30 is located at a predetermined position and the negative electrode 30 retains a constant posture.

Figure 11:
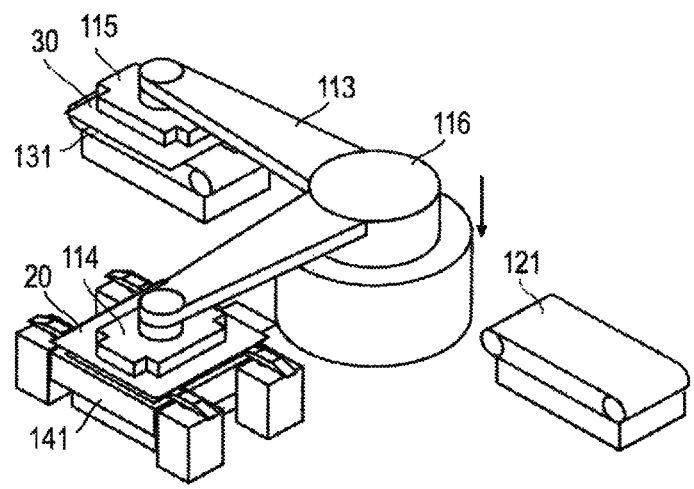
FIG. 11 is a view subsequent to FIG. 10.

Subsequently, the L-shaped arm 113 lowers by a predetermined movement amount (see FIG. 11). When the L-shaped arm 113 lowers, the first and second suction hands 114 and 115 move close to the stacking table 141 and negative electrode feed table 131, respectively. The negative pressure of the first suction hand 114 is released, so that the packaged positive electrode 20 sucked and held by the first suction hand 114 is released. The packaged positive electrode 20 is therefore stacked on the top of the stack. On the other hand, negative pressure is produced at the bottom of the second suction hand 115, and the second suction hand 115 sucks and holds the negative electrode 30 placed on the negative electrode feed table 131. The horizontal position of the negative electrode 30 placed on the negative electrode feed table 131 is adjusted in advance, and the second suction hand 115 can thereby sucks and holds the negative electrode 30 at a precise position.

Figure 12:
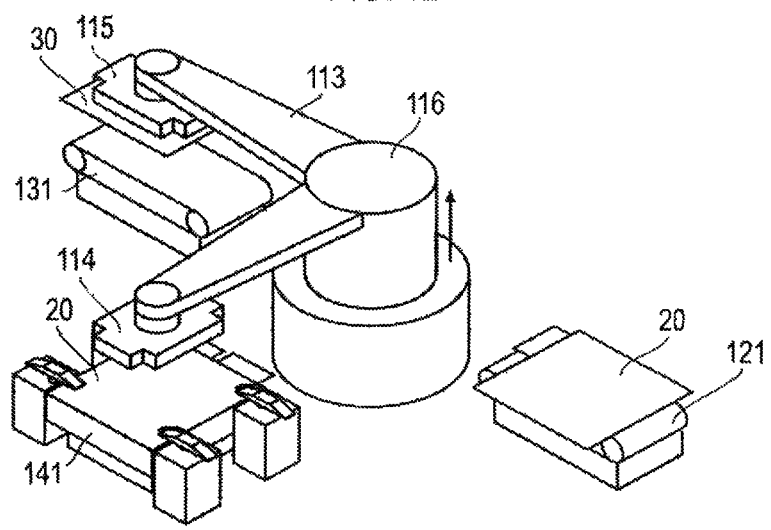
FIG. 12 is a view subsequent to FIG. 11.

Subsequently, the L-shaped arm 113 rises by the aforementioned movement amount (see FIG. 12). When the L-shaped arm 113 rises, the first and second suction hands 114 and 115 move to above the stacking table 141 and the negative electrode feed table 131, respectively. In this process, the second suction hand 115 rises while sucking and holding the negative electrode 30, thus picking up the negative electrode 30 from the negative electrode feed table 131.

Figure 13:
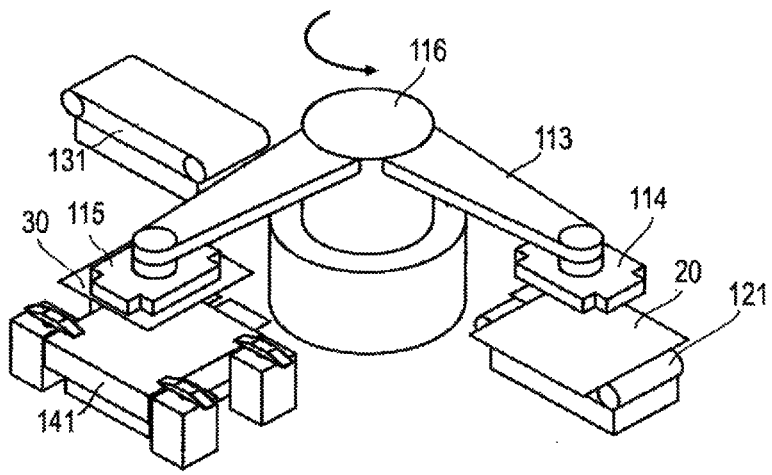
FIG. 13 is a view subsequent to FIG. 12.

Subsequently, the L-shaped arm 113 rotates 90 degrees counterclockwise (see FIG. 13). When the L-shaped arm 113 rotates 90 degrees, the first and second suction hands 114 and 115 move to directly above the positive electrode feed table 121 and stacking table 141, respectively. The second suction hand 115 is sucking and holding the negative electrode 30. On the positive electrode feed table 121, the packaged positive electrode 20 is placed. The horizontal position of the packaged positive electrode 20 on the positive electrode feed table 121 is adjusted based on the positional information obtained by the camera 127 so that the first suction hand 114 can suck and hold the packaged positive electrode 20 (positive electrode 22) at a precise position. To be specific, the horizontal position of the packaged positive electrode 20 is adjusted so that the center of the positive electrode 22 is located at a predetermined position and the positive electrode 22 retains a constant posture.

Figure 14:
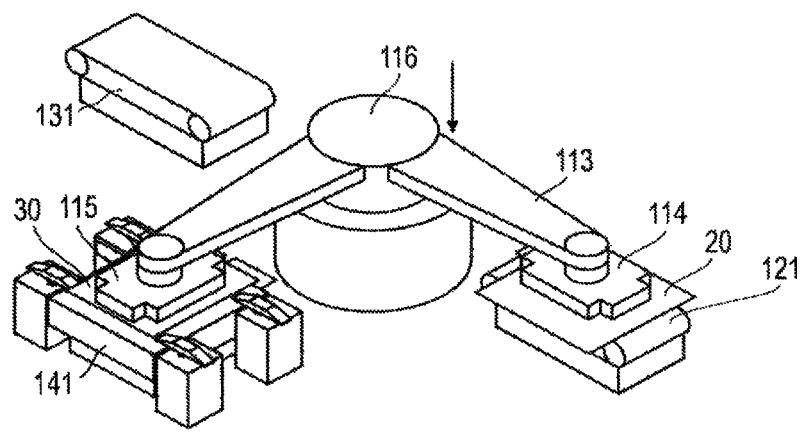
FIG. 14 is a view subsequent to FIG. 13.

Subsequently, the L-shaped arm 113 lowers by the aforementioned movement amount (see FIG. 14). When the L-shaped arm 113 lowers, the first and second suction hands 114 and 115 move close to the positive electrode feed table 121 and stacking table 141, respectively. The negative pressure of the second suction hand 115 is then released, and the negative electrode 30 sucked and held by the second suction hand 115 is detached. The negative electrode 30 is therefore stacked on the top of the stack. On the other hand, negative pressure is produced at the bottom of the first suction hand 114, and the first suction hand 114 sucks and holds the packaged positive electrode 20 placed on the positive electrode feed table 121. The horizontal position of the packaged positive electrode 20 placed on the positive electrode feed table 121 is adjusted in advance. The first suction hand 114 can therefore suck and hold the packaged positive electrode 20 (positive electrode 22) at a precise position.

Figure 15:
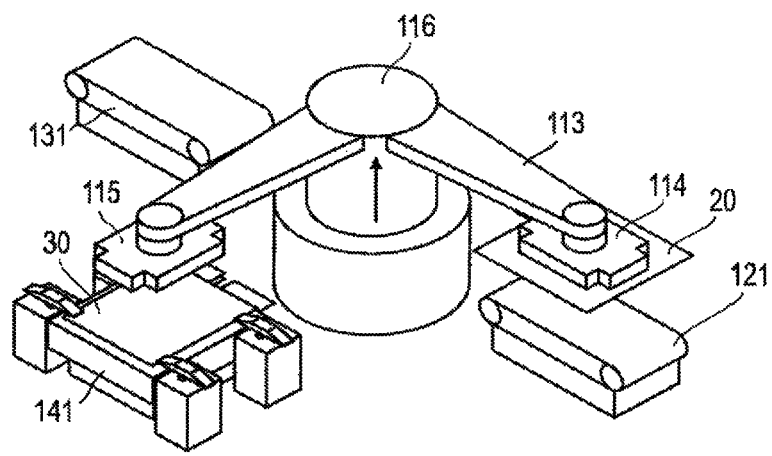
FIG. 15 is a view subsequent to FIG. 14.

Subsequently, the L-shaped arm 113 rises by the aforementioned movement amount (see FIG. 15). When the L-shaped arm 113 rises, the first and second suction hands 114 and 115 move to above the positive electrode feed table 121 and stacking table 141, respectively. In this process, the first suction hand 114 rises while sucking and holding the packaged positive electrode 20, thus picking up the packaged positive electrode 20 from the positive electrode feed table 121.

The L-shaped arm 113 rotates 90 degrees clockwise. When the L-shaped arm 113 rotates 90 degrees, the first and second suction hands 114 and 115 move to above the stacking table 141 and negative electrode feed table 131, respectively (see FIG. 10).

By repeating the aforementioned operation, the packaged positive electrodes 20 and negative electrode 30 are alternately conveyed onto the stacking table 141 and are alternately stacked on the stacking table 141. The predetermined numbers of packaged positive electrodes 20 and negative electrode 30 are then stacked to form a stack as the power generation element 15.

The first and second suction hands 114 and 115 pick up the packaged positive electrode 20 and negative electrodes 30 whose positions are adjusted on the positive electrode feed table 121 and negative electrode feed table 131, respectively, and then release the same at the determined position on the stacking table 141. With such a configuration, the packaged positive electrodes 20 and negative electrodes 30 can be stacked on the stacking table 141 with high accuracy by only constant swinging operation of the L-shaped arm 113 of the stacking robot 110. In other words, the packaged positive electrodes 20 and negative electrodes 30 can be highly precisely stacked on the stacking table 141 with the stacking robot 110 having a simple configuration. Moreover, it is unnecessary to provide a mechanism to adjust the horizontal positions of the packaged positive electrodes 20 and negative electrodes 30 for the distal ends of the first and second arm portions 111 and 112. The first and second arm portions 111 and 112 can be therefore made lightweight. The lightweight first and second arm portions 111 and 112 can be moved at high speed, thus increasing the speed of stacking the packaged positive electrodes 20 and negative electrodes 30.

Figure 16:
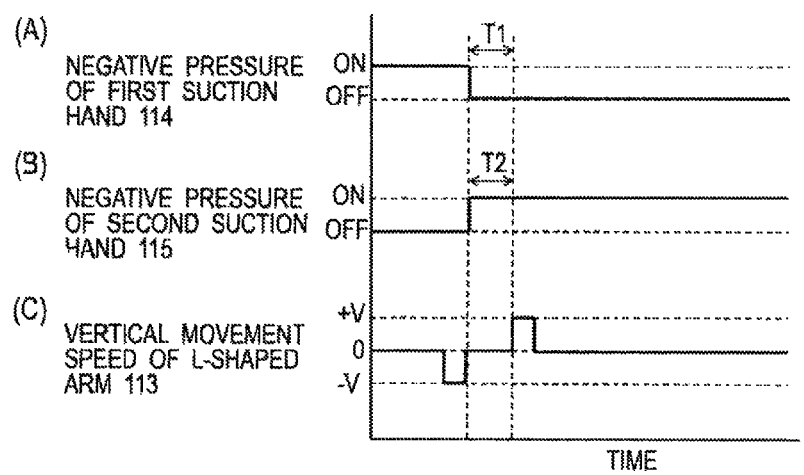
FIG. 16 is a time chart illustrating an example of the operations of the sections of the stacking robot which is stacking each packaged positive electrodes on a stacking table.

FIG. 16 shows time charts illustrating an example of the operations of the sections of the stacking robot which is stacking the packaged positive electrodes on the stacking table. FIG. 16(A) is a time chart showing on and off in the negative pressure generating operation of the first suction hand 114, and FIG. 16(B) is a time chart showing on and off in the negative pressure generating operation of the second suction hand 115. FIG. 16(C) is a time chart showing moving speed of the L-shaped arm 113 in the vertical direction.

As described above, in the process of stacking a packaged positive electrode 20 on the stacking table 141, the L-shaped arm 113 lowers by a predetermined movement amount (see FIG. 11) in a state where the first suction hand 114 which is sucking and holding the packaged positive electrode 20 is located over the stacking table 141 (see FIG. 10).

As illustrated in FIG. 16(C), the L-shaped arm 113 lowers at a constant speed V, for example. When the L-shaped arm 113 lowers by the predetermined movement amount and stops, as illustrated in FIG. 16(A), the negative pressure generating operation of the first suction hand 114 is turned from on to off to release the negative pressure of the first suction hand 114. When the negative pressure of the first suction hand 114 is released, the packaged positive electrode 20 is detached from the first suction hand 114.

On the other hand, as illustrated in FIG. 16(B), the negative pressure generating operation of the second suction hand 115 is turned from off to on to generate negative pressure at the bottom of the second suction hand 115. When the negative pressure is generated at the bottom of the second suction hand 115, the negative electrode 30 on the negative electrode feed table 131 is sucked by the second suction hand 115. Thereafter, the L-shaped arm 113 rises by the predetermined movement amount at the speed V with the negative electrode 30 sucked and held by the second suction hand 115 (see FIG. 12).

In this embodiment, the operation of the first suction hand 114 during a period T1 from when the first suction hand 114 starts to release the negative pressure to just before the L-shaped arm 113 starts to rise (see FIG. 16(A)) is defined as an operation of releasing the packaged positive electrode 20. The operation of the second suction hand 115 during a period T2 from when the second suction hand 115 starts to generate the negative pressure to just before the L-shaped arm 113 starts to rise (see FIG. 16(B)) is defined as an operation of holding the negative electrode 30.

Similarly, at the phase of stacking the negative electrode 30 on the stacking table 141 (see FIGS. 13 to 15), the operation of the second suction hand 115 during a period from when the second suction hand 115 starts to release the negative pressure to just before the L-shaped arm 113 starts to rise is defined as an operation of releasing the negative electrode 30. On the other hand, in the process of picking up the packaged positive electrode 20 placed on the positive electrode feed table 121, the operation of the first suction hand 114 during a period from when the first suction hand 114 starts to generate the negative pressure to just before the L-shaped arm 113 starts to rise is defined as an operation of holding the packaged positive electrode 20.

The operation of the first suction hand 114 between when the first suction hand 114 holds the packaged positive electrode 20 and when the first suction hand 114 releases the same is defined as an operation of conveying the packaged positive electrode 20. The operation of the second suction hand 115 between when the second suction hand 115 holds the negative electrode 30 and when the second suction hand 115 releases the same is defined as an operation of conveying the negative electrode 30.

As illustrated in FIG. 16, the operation of the first suction hand 114 that releases the packaged positive electrode 20 (corresponding to the time T1) temporally overlaps the operation of the second suction hand 115 that holds the negative electrode 30 (corresponding to the time T2). Similarly, the operation of the first suction hand 114 that holds the packaged positive electrode 20 temporally overlaps the operation of the second suction hand 115 that releases the negative electrode 30.

In FIG. 16, the time when the negative pressure generating operation of the first suction hand 114 is turned from on to off substantially equal to the time when the negative pressure generating operation of the second suction hand 115 is turned from off to on. However, the time when the negative pressure generating operation of the first suction hand 114 is turned from on to off is unnecessarily equal to the time when the negative pressure generating operation of the second suction hand 115 is turned from off to on.

Figure 17:
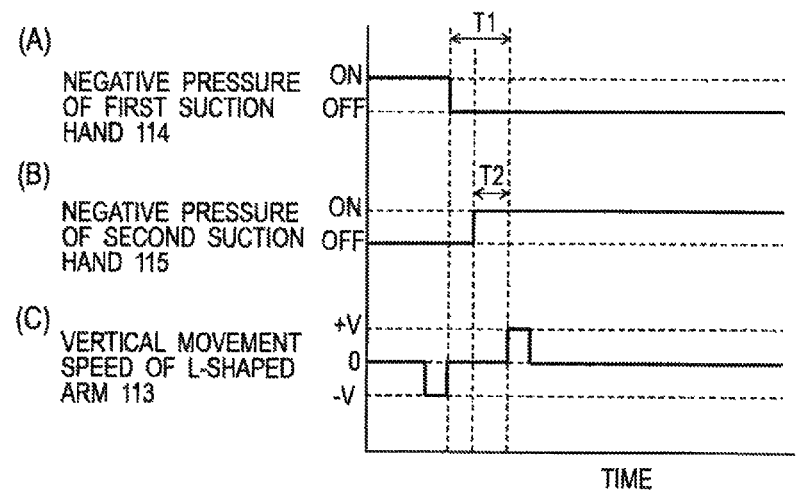
FIG. 17 is a time chart illustrating another example of the operations of the sections of the stacking robot which is stacking each packaged positive electrode on the stacking table.

For example, the negative pressure generating operation of the second suction hand 115 may be turned from off to on after the negative pressure generating operation of the first suction hand 114 is turned from on to off as illustrated in FIG. 17. Even in this case, the operation of the first suction hand 114 that releases the packaged positive electrode 20 partially overlaps the operation of the second suction hand 115 that holds the negative electrode 30 in terms of time.

Next, the operation of the stacking section 140 is described with reference to FIGS. 18 to 23. In the stacking section 140, the stacking table 141 lowers each time that the packaged positive electrode 20 or negative electrode 30 is newly stacked on the stacking table 141 so that the top surface of the stack of packaged positive electrodes 20 and negative electrodes 30 is maintained at a substantially constant height. The following description is given of the operation of the stacking section 140 when the packaged positive electrode 20 is stacked on the stacking table 141 with the first suction hand 114.

Figure 18:
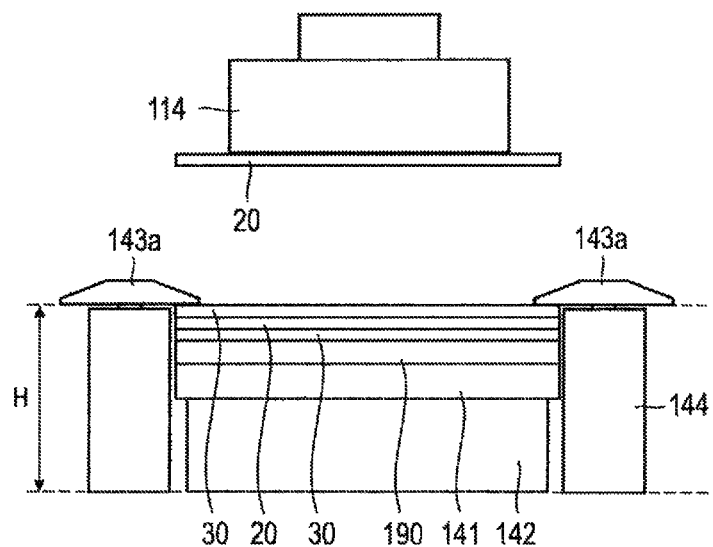
FIG. 18 is a view for explaining the operation of the stacking section.

FIG. 18 is a schematic view illustrating the state of the stacking table and clampers just before a packaged positive electrode 20 is stacked. On the stacking table 141, a stack of alternating packaged positive electrodes 20 and negative electrodes 30 is placed with a pallet 190 interposed between the stack and the stacking table 141. At the top of the stack of the packaged positive electrodes 20 and negative electrodes 30, the negative electrode 30 is laid. The edges of the negative electrode 30 at the top are being pressed by ends of the bottom surfaces of the clamp heads 143a. The first suction hand 114 of the stacking robot 110 is located above the stacking table 141 and sucking and holding a packaged positive electrode 20.

Figure 19:
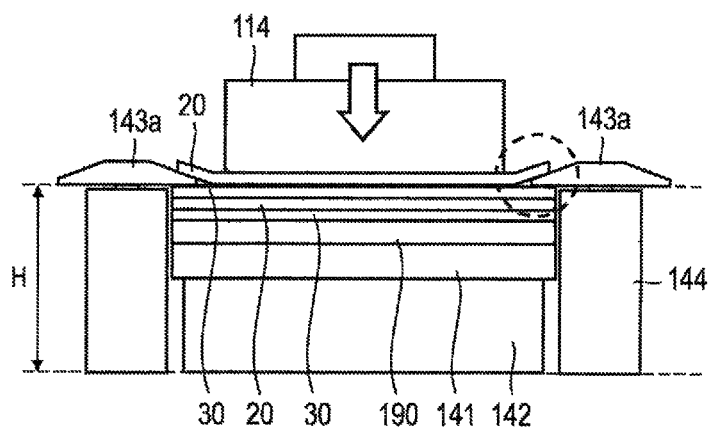
FIG. 19 is a view subsequent to FIG. 18.

Subsequently, the first suction hand 114 lowers close to the stacking table 141 (see FIG. 19). The first suction hand 114 lowers by a predetermined movement amount while sucking and holding the packaged positive electrode 20. When the first suction hand 114 lowers, the packaged positive electrode 20 is stacked on the top of the stack. In this process, the edges of the packaged positive electrode 20 cover the clamp heads 143a (see the portion surrounded by a dashed line in FIG. 19).

Figure 20:
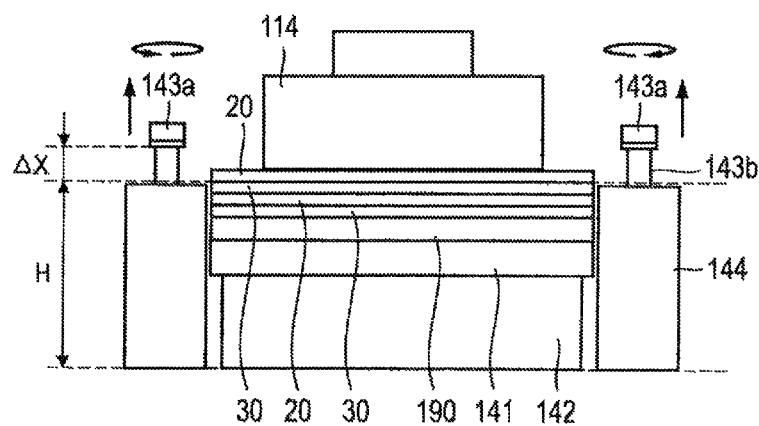
FIG. 20 is a view subsequent to FIG. 19.

Subsequently, the clamp heads 143a rise and rotate 90 degrees (see FIG. 20). To be specific, the clamp heads 143a covered with the edges of the packaged positive electrode 20 rise and rotate 90 degrees. When the clamp heads 143a rise and rotate 90 degrees, the respective clamp heads 143a are diagonally above the packaged positive electrode 20 laid at the top. Herein, the rising amount ΔX of each clamp head 143a is a substantially constant value larger than the thickness of each packaged positive electrode 20. As the clamp heads 143a rise, the edges of the packaged positive electrode 20 are raised by the clamp heads 143a. When raised by the clamp heads 143a, the edges of the packaged positive electrode 20 are temporarily turned and are then returned.

Figure 21:
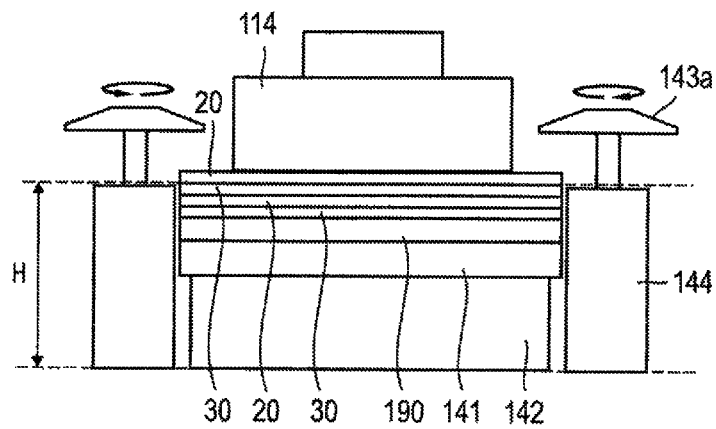
FIG. 21 is a view subsequent to FIG. 20.

Subsequently, the clamp heads 143a further rotate 90 degrees (see FIG. 21). Specifically, the clamp heads 143a rotate 90 degrees while further rising by a predetermined amount. When the clamp heads 143a rotate 90 degrees, the other ends of the clamp heads 143a are located over the packaged positive electrode 20. The operation of the clamp heads 143a that rotates 90 degrees and the operation of the clamp heads 143a that further rotates 90 degrees are continuously performed.

Figure 22:
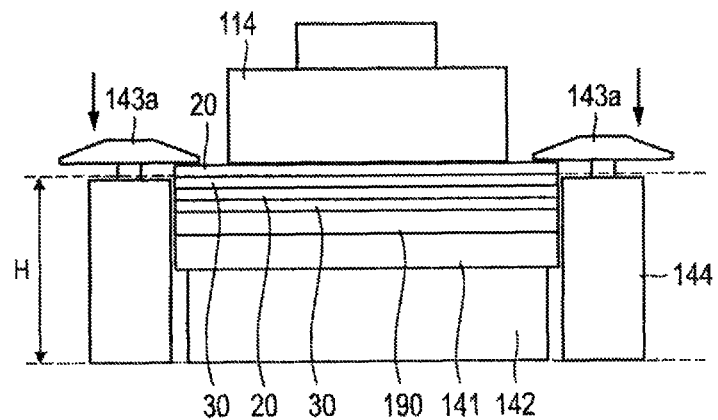
FIG. 22 is a view subsequent to FIG. 21.

Subsequently, the clamp heads 143a lower (see FIG. 22). When the clamp heads 143a lower, the other ends of the bottom surfaces of the clamp heads 143a press upper portions of the edge of the packaged positive electrode 20 from above.

Figure 23:
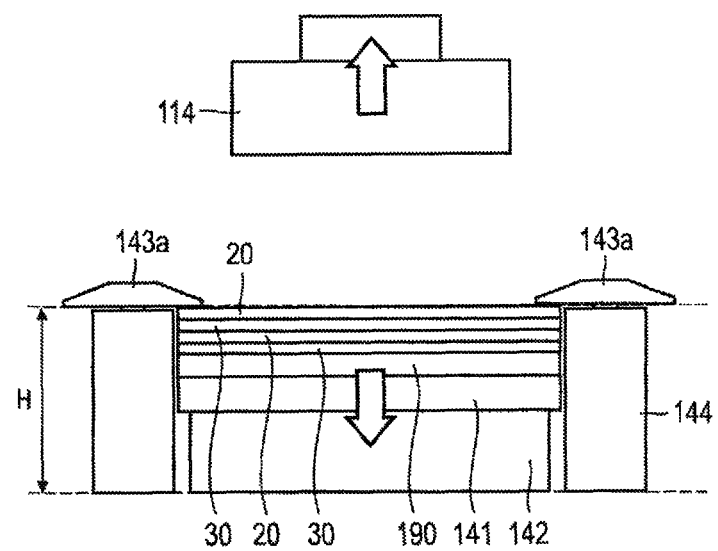
FIG. 23 is a view subsequent to FIG. 22.

The first suction hand 114 then rises, and the stacking table 141 lowers (see FIG. 23). In this process, the first suction hand 114 rises by the aforementioned movement amount while the stacking table 141 lowers by a predetermined lowering amount. Specifically, the stacking table 141 lowers by the predetermined lowering amount so that the height of the top surface of the stack after the new packaged positive electrode 20 is stacked is substantially equal to a height H of the top surface of the stack before the new packaged positive electrode 20 is stacked. Herein, the lowering amount is an average of thickness of the packaged positive electrodes 20 and negative electrodes 30, for example.

As described above, when a new packaged positive electrode 20 (or negative electrode 30) is stacked on the top of the stack pressed by the clamp heads 143a, the clamp heads 143a once move diagonally upward and then press the new packaged positive electrode 20. In this process, the stacking table 141 lowers by the predetermined lowering amount so that the height of the top surface of the stack is maintained substantially constant. When the stacking table 141 lowers to maintain the height of the top surface of the stack substantially constant, the rising amount of the clamp heads 143a can be maintained to a substantially constant value smaller than the final thickness of the stack even when the thickness of the stack increases with the progress of stacking of the packaged positive electrodes 20 and negative electrode 30. The rising amount of each clamp head 143a can be therefore maintained equal to the total thickness of several packaged positive electrodes 20 from the beginning to the end of the stacking process, for example. Accordingly, the edges of the packaged positive electrodes 20 and negative electrodes 30 are less turned when the clampers 143 rise than those in the case where the rising amount of clampers is larger than the final thickness of the stack. In other words, the packaged positive electrodes 20 and negative electrodes 30 can be stacked without being significantly deformed.

According to the stacking section 140 of the embodiment, moreover, the height of the top surface of the stack is maintained substantially constant while the packaged positive electrode 20 and negative electrode 30 are repeatedly stacked. Accordingly, the amounts of vertical movement of the first and second suction hands 114 and 115 (strokes) can be maintained constant. In other words, the packaged positive electrodes 20 and negative electrodes 30 can be stacked on the stacking table 141 with the stacking robot 110 having a simple configuration. Moreover, it is unnecessary to provide a mechanism to adjust the vertical positions of the first and second suction hands 114 and 115 for the distal ends of the first and second arm portions 111 and 112, and the first and second arm portions 111 and 112 can be made lightweight. The lightweight first and second arm portions 111 and 112 can be moved at high speed, thus increasing the speed of stacking the packaged positive electrodes 20 and negative electrodes 30.

In this embodiment, the stacking table 141 lowers by a downward amount corresponding to the average of the thicknesses of the packaged positive electrodes 20 and negative electrodes 30 each time that a new packaged positive electrode 20 or negative electrode 30 is stacked on the stack. However, the stacking table 141 may lower by the same amount as the thickness of a packaged positive electrode 20 or negative electrode 30 each time the packaged positive electrode 20 or negative electrode 30 is newly stacked on the stack. Alternatively, the stacking table 141 may lower each time a predetermined number of packaged positive electrodes 20 and a predetermined number of negative electrodes 30 are stacked (two packaged positive electrodes 20 and two negative electrodes 30, for example).

In this specification, the description that the rising amount (movement amount) of each clamp head 143a is substantially constant includes not only the case where the rising amount of each clamp head 143a moved to a position diagonally above the packaged positive electrode 20 or negative electrode 30 is always constant, but also a case where the rising amount of each clamp head 143a a little varies. The rising amount is maintained always constant in the case where each time a new packaged positive electrode 20 (or negative electrode 30) is stacked on the stack, the stacking table 141 lowers by an amount equal to the thickness of the packaged positive electrode 20 (or negative electrode 30). On the other hand, when the stacking table 141 lowers by an amount corresponding to the average of the thicknesses of the packaged positive electrodes 20 and negative electrodes 30, the rising amount of each clamp head 143a varies by an amount corresponding to the difference between the average thickness and the thickness of the packaged positive electrodes 20 and the difference between the average thickness and the thickness of the negative electrodes 30. In the specification, the description that the rising amount is substantially constant includes a case where the rising amount of each clamp head 143a a little varies as described above depending on the way how the stacking table 141 lowers.

Next, a description is given of a modification of the clampers with reference to FIG. 24.

FIG. 24 is a perspective view illustrating a modification of the clampers. As illustrated in FIG. 24, a clamper 143 according to a modification includes a clamp head 143a having a circular-arc shaped cross section. Specifically, the upper surface of the clamp head 143a which comes into contact with the lower surfaces of the packaged positive electrodes 20 and negative electrodes 30 is circular-arc along the longitudinal direction.

With such a configuration, the upper surface of each clamp head 143a can come into smooth contact with the bottom surfaces of the packaged positive electrodes 20 or negative electrodes 30. It is therefore possible to prevent the upper surfaces of the clamp heads 143a from damaging the lower surfaces of the packaged positive electrodes 20 or negative electrodes 30.

Preferably, the upper surface of the clamp head 143a is circular not only in the longitudinal direction but also in the direction orthogonal to the longitudinal direction.

Hereinabove, the above-described embodiment provides the following effects.

(a) The positions of the packaged positive electrode and negative electrode are adjusted just before the packaged positive electrode and negative electrode are sucked and held by the first and second suction hands. The first and second suction hands can therefore suck and hold the packaged positive electrode and negative electrode with high positional accuracy, respectively. Accordingly, the packaged positive electrodes and negative electrodes can be stacked efficiently with high accuracy. Moreover, the horizontal positions of the packaged positive electrodes and negative electrodes are adjusted on the positive electrode and negative electrode feed tables. Accordingly, the configuration of the stacking robot can be simplified, and the first and second arm portions can be made lightweight. The first and second arm portions made lightweight can be moved at high speed. This can increase the speed of stacking the packaged positive electrodes and negative electrodes. Furthermore, it is unnecessary to position the packaged positive electrodes and negative electrodes by bringing the side surfaces thereof into contact with a positioning member (a holder, for example) on the stacking table. This prevents the edges of separators from coming into contact with the positioning member to be folded. It is therefore possible to form a high-quality secondary battery.

(b) The two arm portions of the stacking robot can be extended at arbitrary angles. Accordingly, the arm portions can be variously arranged corresponding to the space where the sheet stacking device is applied.

(c) The positions of the packaged positive electrodes and negative electrodes are recognized by cameras capturing images of the packaged positive electrodes and negative electrodes, respectively. Accordingly, the horizontal positions of the packaged positive electrodes and negative electrodes can be easily adjusted by using image processing.

(d) The positions of the positive electrodes within the packaged positive electrodes are adjusted, and the positive electrodes are aligned with the negative electrodes. Accordingly, the produced lithium ion secondary battery has higher performances than those in the case where the packaged positive electrodes are aligned with the negative electrodes.

(e) The stacking table lowers so that the vertical position of the top surface of the stack of the packaged positive electrodes and negative electrodes stacked on the stacking table is maintained substantially constant. The amounts of vertical movements of the first and second suction hands can be maintained constant. Accordingly, the configuration of the stacking robot can be simplified. Moreover, it is unnecessary to provide a mechanism to correct the height for the distal ends of the first and second arm portions. Accordingly, the first and second arm portions can be made lightweight, thus increasing the speed of stacking the packaged positive electrodes and negative electrodes.

(f) The stack of the packaged positive electrodes and negative electrodes is pressed by the clampers. It is therefore possible to prevent misalignment of the packaged positive electrodes and negative electrodes at the stacking process. Accordingly, the packaged positive electrodes and negative electrodes can be stacked with high accuracy.

Hereinabove, the embodiment of the present invention is described. However, the embodiment is just an example described to facilitate understanding of the present invention, and the present invention is not limited by the embodiment. The technical scope of the present invention includes not only the specific technical matters disclosed in the above-described embodiment and the like but also various modifications, changes, and alternative techniques which can be easily derived therefrom.

The above-described embodiment is described with the example where the packaged positive electrodes formed of the positive electrodes sandwiched by the separators and the negative electrodes are alternately stacked, for example. However, positive electrodes and packaged negative electrodes formed of negative electrodes sandwiched by separators may be alternately stacked.

Moreover, the secondary battery formed by the stacking device of the present invention is not limited to the type where the positive-electrode and negative-electrode leads are extended from a same end of the exterior material and may be a type where the positive-electrode and negative-electrode leads are extended from both ends of the exterior material.

This application is based upon and claims the benefit of priority to Japanese Patent Application No. 2011-085788 filed on Apr. 7, 2011, and Japanese Patent Application No. 2012-067848 filed on Mar. 23, 2012, the entire contents of which are incorporated herein by reference.

INDUSTRIAL APPLICABILITY

According to the present invention, the positions of a separator-electrode assembly and a second electrode are adjusted just before the separator-electrode assembly and second electrode are held by the first and second holding units, and the first and second holding units can hold the separator-electrode assembly and second electrode with high positional accuracy. Accordingly, the separator-electrode assembly and second electrode can be stacked efficiently and accurately.

REFERENCE SIGNS LIST 10 lithium ion secondary battery
20 packaged positive electrode (separator-electrode assembly)
22 positive electrode (first electrode)
30 negative electrode (second electrode)
40 separator
100 sheet stacking device (stacking device)
110 stacking robot
111, 112 arm portion
113 L-shaped arm
114, 115 suction hand (holding unit)
116 driving shaft
117 arm driving unit
120 positive electrode feed section
121 positive electrode feed table (first table)
122, 132 table driving unit (adjustment unit)
126, 136 light source
127, 137 camera (image capturing unit)
130 negative electrode feed section
131 negative electrode feed table (second table)
140 stacking section
141 stacking table
142 height adjustment unit
143 clamper
144 clamper driving unit

The invention claimed is:

1. A stacking device for alternately stacking a separator-electrode assembly and a second electrode, the separator-electrode assembly including a first electrode sandwiched by separators, the second electrode having a different polarity from the first electrode, the stacking device comprising:
a first table on which the separator-electrode assembly is placed;
a second table on which the second electrode is placed;
a stacking table on which the separator-electrode assembly and the second electrode are alternately stacked;
a first adjustment unit configured to adjust a horizontal position of the first table to adjust the position of the separator-electrode assembly placed on the first table;
a second adjustment unit configured to adjust a horizontal position of the second table to adjust the position of the second electrode placed on the second table;
a first holding unit configured to hold and release the separator-electrode assembly; and
a second holding unit configured to hold and release the second electrode, wherein
the first holding unit reciprocates between the first table and the stacking table and the second holding unit reciprocates between the stacking table and the second table,
when the first holding unit holds the separator-electrode assembly whose position has been adjusted on the first table, the second holding unit releases the second electrode over the stacking table, and
when the first holding unit releases the separator-electrode assembly over the stacking table, the second holding unit holds the second electrode whose position has been adjusted on the second table.

2. The stacking device according to claim 1, wherein the first and second holding units are respectively provided at distal ends of first and second arm portions which are disposed at a predetermined angle to each other and configured to swing by the predetermined angle with respect to the same rotational axis, and
the first and second tables are individually arranged at the predetermined angle apart from the stacking table around the rotational axis.

3. The stacking device according to claim 1, further comprising:
a first image capturing unit configured to capture an image of the separator-electrode assembly placed on the first table to recognize the position of the separator-electrode assembly placed on the first table; and
a second image capturing unit configured to capture an image of the second electrode placed on the second table to recognize the position of the second electrode placed on the second table, wherein
the first and second adjustment units adjust the positions of the separator-electrode assembly and the second electrode based on information of the positions recognized by the first and second image capturing units, respectively.

4. The stacking device according to claim 3, wherein
the first image capturing unit recognizes the position of the first electrode within the separator-electrode assembly, and
the first adjustment unit adjusts the position of the first electrode within the separator-electrode assembly.

5. The stacking device according to claim 1, further comprising:
a height adjustment unit configured to lower the stacking table according to the progress of stacking the separator-electrode assembly and the second electrode so that a vertical position of a top surface of a stack of the separator-electrode assembly and the second electrode which is stacked on the stacking table is maintained in a certain range.

6. The stacking device according to claim 5, further comprising a clamper configured to press the stack on the stacking table from above.

7. A stacking method of alternately stacking a separator-electrode assembly and a second electrode, the separator-electrode assembly including a first electrode sandwiched by separators, the second electrode having a different polarity from the first electrode, the method comprising:

causing a first holding unit to reciprocate between a first table on which the separator-electrode assembly is placed and a stacking table on which the separator-electrode assembly and the second electrode are alternately stacked, causing a second holding unit to reciprocate between the stacking table and a second table on which the second electrode is placed;

causing the second holding unit to release the second electrode over the stacking table when causing the first holding unit to hold the separator-electrode assembly whose position has been adjusted on the first table by adjustment of a horizontal position of the first table; and causing the second holding unit to hold the second electrode whose position has been adjusted on the second table by adjustment of a horizontal position of the second table when causing the first holding unit to release the separator-electrode assembly over the stacking table.

8. The stacking method according to claim 7, wherein the first and second holding units are respectively provided at distal ends of first and second arm portions which are disposed at a predetermined angle to each other and configured to swing by the predetermined angle with respect to the same rotational axis, and each of the first and second tables is individually arranged at the predetermined angle apart from the stacking table around the rotational axis.

9. The stacking method according to claim 7, further comprising:

recognizing the position of the separator-electrode assembly placed on the first table by capturing an image of the separator-electrode assembly placed on the first table with a first image capturing unit;

recognizing the position of the second electrode placed on the second table by capturing an image of the second electrode placed on the second table with a second image capturing unit; and adjusting the positions of the separator-electrode assembly and the second electrode based on information of the positions recognized by the first and second image capturing units, respectively.

10. The stacking method according to claim 9, wherein
the position of the first electrode within the separator-electrode assembly is recognized by the first image capturing unit, and
the position of the first electrode within the separator-electrode assembly is adjusted.

11. The stacking method according to claim 7, further comprising:

lowering the stacking table according to the progress of stacking the separator-electrode assembly and the second electrode so that the vertical position of the top surface of the stack of the separator-electrode assembly and the second electrode which is stacked on the stacking table is maintained in a certain range.

12. The stacking method according to claim 11, wherein the stack on the stacking table is pressed by a clamper from above.

13. A stacking device for alternately stacking a separator-electrode assembly and a second electrode, the separator-electrode assembly including a first electrode sandwiched by separators, the second electrode having a different polarity from the first electrode, the stacking device comprising:

a first table on which the separator-electrode assembly is placed;

a second table on which the second electrode is placed;

a stacking table on which the separator-electrode assembly and the second electrode are alternately stacked;

first adjusting means for adjusting a horizontal position of the first table to adjust the position of the separator-electrode assembly placed on the first table;

second adjusting means for adjusting a horizontal position of the second table to adjust the position of the second electrode placed on the second table;

first holding means for holding and releasing the separator-electrode assembly; and second holding means for holding and releasing the second electrode, wherein the first holding means reciprocates between the first table and the stacking table and the second holding means reciprocates between the stacking table and the second table, when the first holding means holds the separator-electrode assembly whose position has been adjusted on the first table, the second holding means releases the second electrode over the stacking table, and when the first holding means releases the separator-electrode assembly over the stacking table, the second holding means holds the second electrode whose position has been adjusted on the second table.

* * * * *